US007961447B2

(12) United States Patent
Cernička

(10) Patent No.: US 7,961,447 B2
(45) Date of Patent: Jun. 14, 2011

(54) DEVICE FOR A REMOTE MONITORING THE STATE OF AT LEAST A SINGLE-POLE SURGE PROTECTION DEVICE

(75) Inventor: Jozef Cernička, Nitra (SK)

(73) Assignee: Kiwa Spol. S.R.O., Nitra (SK)

( * ) Notice: Subject to any disclaimer, the term of this patent is extended or adjusted under 35 U.S.C. 154(b) by 624 days.

(21) Appl. No.: 11/911,903

(22) PCT Filed: Oct. 10, 2005

(86) PCT No.: PCT/IB2005/003238

§ 371 (c)(1),
(2), (4) Date: Jul. 28, 2008

(87) PCT Pub. No.: WO2006/111793

PCT Pub. Date: Oct. 26, 2006

(65) Prior Publication Data

US 2009/0244795 A1 Oct. 1, 2009

(30) Foreign Application Priority Data

Apr. 19, 2005 (CS) ................................ PV2005-247

(51) Int. Cl.
*H02H 9/06* (2006.01)
*H02H 3/22* (2006.01)

(52) U.S. Cl. ....................................... 361/118; 361/119

(58) Field of Classification Search .................. 361/118, 361/119

See application file for complete search history.

(56) References Cited

U.S. PATENT DOCUMENTS 5,701,110 A * 12/1997 Scheel et al. .................. 335/132
5,836,441 A * 11/1998 Scheel et al. ................ 200/17 R
7,411,769 B2 * 8/2008 Schimanski et al. ......... 361/91.1
2005/0231872 A1 10/2005 Schimanski et al.

FOREIGN PATENT DOCUMENTS

DE 38 05 890 A1 5/1989
DE 3805889 A1 * 5/1989
DE 4334101 A1 * 4/1994
DE 100 01 667 C1 10/2001

OTHER PUBLICATIONS

International Search Report, May 11, 2006.

* cited by examiner

*Primary Examiner* — Ronald W Leja
(74) *Attorney, Agent, or Firm* — Dority & Manning, P.A.

(57) ABSTRACT

The invention relates to a device for a remote monitoring the state of at least a single-pole surge protection which consists of a bracket (1) and at least one slide-in protective member (2) whereas the bracket (1) and also the slide-in protective members (2) are fitted with mechanical devices for detecting the status change of each of the slide-in protective members (2) and the bracket (1) is further fitted with devices for the status change of the switch (4) on the basis of a status change of some of the slide-in protective members (2) whereas the switch (4) is fitted with devices for connecting to the remote conduit of the status change of the switch (4) signal.

8 Claims, 2 Drawing Sheets

DEVICE FOR A REMOTE MONITORING THE STATE OF AT LEAST A SINGLE-POLE SURGE PROTECTION DEVICE

TECHNICAL FIELD

The invention relates to a device for a remote monitoring the state of at least a single-pole surge protection device (surge protector) which consists of a bracket and at least one slide-in protective member whereas the bracket and also the slide-in protective members are fitted with mechanical devices for detecting the status change of each of the slide-in protective members, and the bracket is further fitted with devices for the status change of the switch on the basis of a status change of some of the slide-in protective members whereas the switch is fitted with devices for connecting to the remote signal conduit of the switch status change.

BACKGROUND ART

The protective member's status of surge protectors can be, as a rule, detected optically directly on the protective member. However, there is very often a requirement for a remote detection of the surge protector's status, or in particular for on a remote information transfer on the surge protector's status which is, as a rule, realized by means of electric signal.

The well-known solutions of a remote signalling of the surge protector state consist of an appropriate arrangement of various mechanical components, by means of which the surge protector state is sensed, or in particular the state of the protective members of particular poles of the surge protector. If there is a status change of at least one protective member, this change is, by means of mechanical components, transferred to a switch, by which status change is formed an electric signal, which is further transferred as an information on the surge protector state through the electric line. By means of such arrangement, it is possible to detect simply and cheaply the status change of the surge protector also at a distance. The definition "switch" is represented by any possible kind of electric components with a switching function, disconnecting function, changeover switch etc., regardless of their magnitude and design. However, for economic reasons there are decreasingly used solutions where each pole of the surge protector is fitted with a switch and there are increasingly used solutions where more poles of the surge protector have one shared switch.

One of such solutions is the one according to DE 38 05 890 C2 in which protective member brackets of particular poles of the surge protector are mutually connected and they are fitted with a shared drawbar situated in the direction of the row of brackets over all of the surge protector's poles. The drawbar movement is controlled by mechanical components which, in each of the poles, comprise a number of arms with a number of springs. The position of arms depends on the protective member state. By means of a change of the protective member, it comes to a position change of the arm in the bracket, which is transferred to a drawbar and evokes its movement towards the switch which is positioned in an individual box mounted in the end of the brackets to the last bracket. Due to the action of the drawbar end on the switch, the switch status changes and generates an electric signal which is by an electric line transferred to a relevant distant place.

The disadvantage of this solution, other than higher costs, consists particularly in increased space demands which represent a disadvantage particularly in surge protectors with a lower number of poles.

The disadvantage of the solution according to DE 38 5 890 C2 is eliminated by means of the solution according to DE 100 01 667 C1 which integrates the switch directly into the surge protector bracket. The bracket is made as an independent assembly for 3 or 4 poles of the surge protector, i.e. for 3 or 4 protective members. There is a hinged lever positioned in the bracket which continuously acts on the switch only if none of the poles is disconnected from the main supply. Each pole is fitted with a mechanical component and a spring which, while disconnecting the surge protector pole from the main supply, causes tilting the arm from its normal position cancelling its action on the switch. Due to this, the switch changes status causing an electric signal which is further transferred by an electric line into the particular remote destination.

The disadvantage of this solution is that it is bound to the particular arrangement of the bracket according to DE 100 01 667 C1. Another disadvantage is that the signalling function does not allow rotation of the varistor insert through 180° which is given by assymetric positioning of the indicating component of the varistor insert. Another disadvantage consists in a permanent action of the hinged lever on the switch, until comes to a disconnection of any of the protective members of the surge protector from the main supply which is demanding on a regular and long-durable pressure setting of the hinged lever onto the switch.

There is also known a solution according to DE utility design Nr. 20 2004 006 227 U1, which also employs a hinged lever mounted in the bracket of the protective member or members. The hinged lever is in the normal state continuously pressed down to the switch and the mechanical components indicating the state of the surge protector protective member do not act against the lever. Provided that then a status change of the protective member occurs, the mechanical components indicating this change begin to act against the action of the spring pressing the hinged lever to the switch by means of another spring (mounted as a part of the mechanical components), by means of which comes to an internal status change of the switch which generates an electric signal, which is being transferred through an electric line to the relevant remote destination.

The disadvantage of this solution consists in that it needs a coordinated action of a number of springs, by means of which this solution is sensitive to manufacturing variations in the system of used elements and also sensible to a contingent time-stability of the parameters of particular springs. It results in usage limitation of one switch for only a small number of surge protector poles, while concurrent demand on relatively heavy duty design of the hinged lever by virtue of acting forces magnitude and possible deformations, which represents another drawback of this solution.

The goal of the invention is to eliminate or at least to minimize the drawbacks of the present background art.

THE PRINCIPLE OF THE INVENTION

Objects and advantages of the invention are set forth in part in the following description, or may be obvious from the description, or may be learned through practice of the invention.

A goal of the invention has been reached by a device for remote monitoring of the state of a surge protector, whose principle consists in that there is a suspended positioning element mounted in a bracket in a reciprocal manner for each slide-in protective member, where the positioning element bears by its indicating end on a sliding member in an associated slide-in protective member in the state of connection of the surge protector to the electric circuit, whereas each positioning element is on its other end fitted with a flange, where between the flange and the associated protective member a free end of a through signalling plate is situated, which is by its other end pivoted on the bracket along the axis situated in the direction of the bracket width, where there is further a switch mounted in the bracket which control element is situated in the pathway of the signalling plate after the status change of the associated slide-in protective member.

The device utilizes a simple, reliable and durable arrangement with a signalling plate of a low weight and a sufficient rigidity which enables sensing the state of some surge protector poles by one signalling plate and one switch. There is no spring or another element to act on the signalling plate in the faultless state which would hold the signalling plate in the defined position. Because the signalling plate is very light, it cannot cause a change of the switch state by its weight in any position of the bracket. By means of this, is reached a significant simplification of the construction and a reduction of the manufacturing costs.

According to one preferred embodiment, the suspended positioning elements are in the bracket placed in a position in which they bear by their indicating ends on a sliding member in associated slide-in protective members both in the normal position and also in the turned through 180° position, thus there occurs no change in the device properties while angular rotation of the slide-in protective member in the bracket.

According to one preferred embodiment there is a positioning element, fitted with a flange on its other end, fitted with a cavity in which there is a pressure spring positioned, which is by one end based on the bottom of the cavity in the positioning element and it leans against the wall of the bracket by its other end, which is a simple, reliable and durable solution.

From the manufacturing view, it is preferred that the signalling plate is fitted on the side edges of its other end with studs pivoted along the axis in the direction of the bracket width in the recesses of the bracket.

The signalling plate is in the preferred embodiments made of a fiberglass or plastic.

To prevent sliding the slide-in protective member with wrong protective properties into the bracket, it is preferred that the slide-in protective members of different protective properties are fitted with mutually different first identifiers, whereas the bracket is for each pole of the surge protector fitted with the second identifier which contains identification elements corresponding only to the identification elements on the first identifiers of the slide-in protective members with the corresponding protective properties.

DESCRIPTION OF THE DRAWINGS

The invention is schematically shown in the drawing where.

DESCRIPTION OF EXAMPLES OF EMBODIMENT

Figure 1:
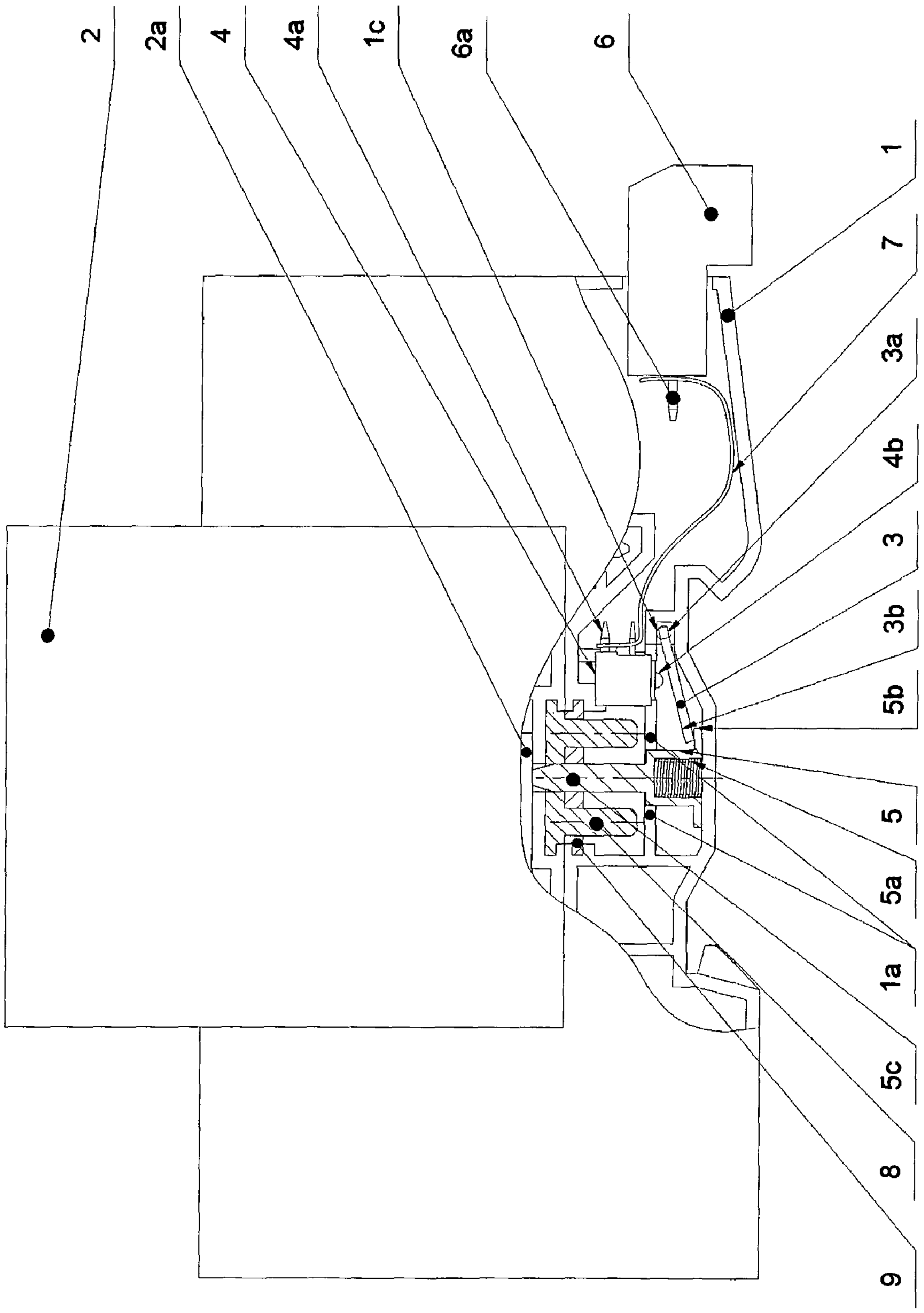
FIG. 1 represents a cross-section of a U-shaped bracket in which there is a switch and a connecting block positioned.
Figure 2:
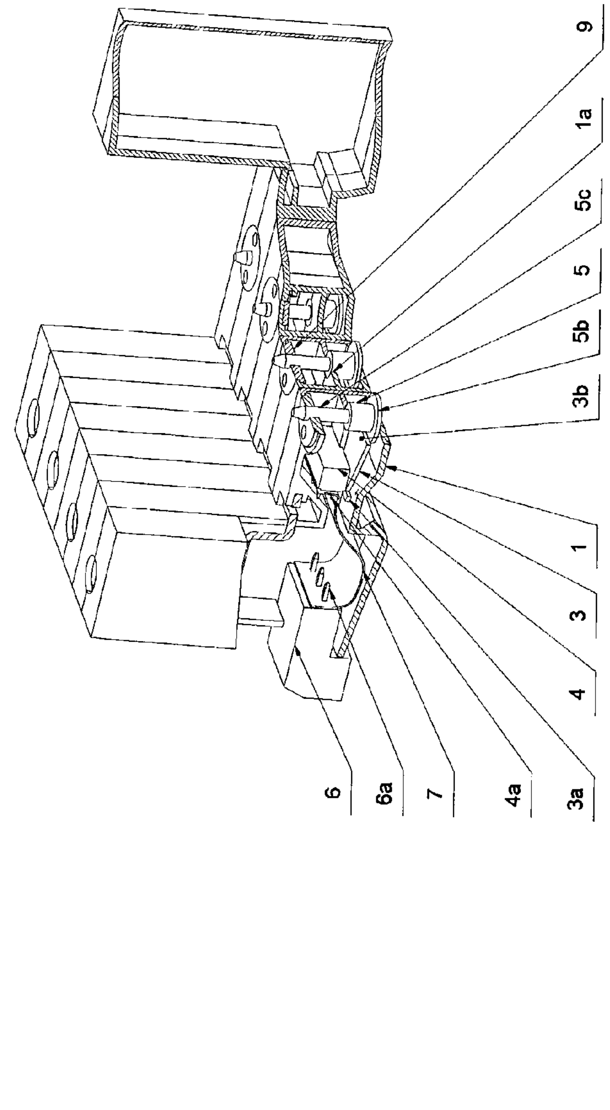
FIG. 2 represents a device in a four-pole arrangement and FIG. 2*a* represents a floor projection of a signalling plate.
Figure 2A:
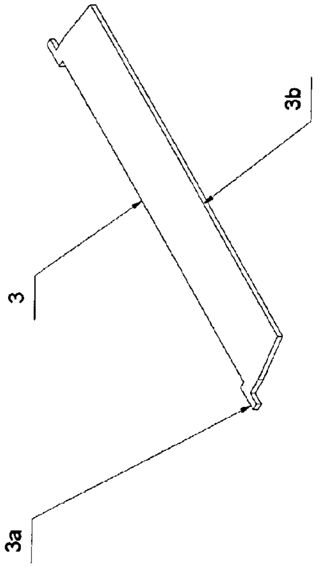

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

A device for a remote monitoring the state of at least a single-pole surge protector comprises a U-shaped bracket 1. There is one slide-in protective member 2 for each pole of the surge protector slid into the bracket 1. The bracket 1 can be formed as one body or it can be made as a number of bodies (e.g. one body for each surge protector pole) connected into one piece by, for instance rivets or another appropriate connecting members.

The slide-in protective members 2 are fitted with a sliding member 2*a* which indicates the state of the slide-in protective member 2 by means of its position. If the protective member 2 is connected to the electric circuit, i.e. it is able to perform its protective function; the sliding member 2*a* is situated in the position shown in the FIG. 1, in which the indicating end 5*c* of the positioning element 5 bears on the sliding member.

The positioning element 5, or the members in the multi-pole surge protector, is mounted in the bracket 1 in the place of each of the slide-in protective members 2, whereas it is mounted in a reciprocal manner in the direction of sliding-in the slide-in protective members 2 into the bracket 1 on the place of each of the slide-in protective members 2 in the bracket 1. The positioning element 5 is in the place of each of the slide-in protective members 2 in the bracket 1 for improving its movement being led in a guiding which is in the represented example formed by a cylindrical wall of the through hole in the wall 1*a* of the bracket 1. The positioning element 5 is in the direction towards the slide-in protective member 2 suspended by means of a pressure spring 5*a* leaning by one of its end against the surface of the bracket 1 and by its other end against the positioning element 5. The pressure spring 5*a* is compressed in the retracted position of the slide-in protective member 2 which is connected to the main supply, and the positioning element 5, with its end preferably fitted with flange 5*b*, bears on the bracket 1 surface or it is in the vicinity of the surface.

To prevent replacement of the slide-in protective member 2 with particular protective properties for a slide-in protective member 2 with other protective properties in the bracket 1, for instance by sliding a wrong slide-in protective member 2 into the bracket 1, the slide-in protective members 2 of various protective properties are fitted with mutually different first identifiers 8, whereas the bracket 1 is for each pole of the surge protector fitted with the second identifier 9 which comprises such identifying components, for instance studs and openings, to which only identifying components on the first identifiers 8 of the slide-in protective members 2 with corresponding protective properties correspond. The components on identifiers 9 on the bracket 1 have, for instance, such dimensions, e.g. width, length etc., that it is possible to slide into such bracket 1 only protective members 2 of precisely specified protective properties which ensures correct assignment of particular protective member 2 to the bracket 1 at all times. In the case that identifiers 8 and 9 on the slide-in protective member 2 and on the bracket 1 are not mutually corresponding, it is not possible to reach a functional connection of the bracket 1 and the slide-in protective member 2; thereby the risk of sliding the wrong slide-in protective member 2 into the bracket 1 is limited. The identifying components of the identifiers 8 and 9 are arranged in such manner that the identifying functions are preserved also while rotating the slide-in protective member 2 through 180°.

In the represented example, the positioning part 5 is led during its reciprocal movement in the opening of the identifier 9 of the bracket 1 through which the positioning part 5 or, in particular, its indicating end 5*c*, passes through.

There is a signalling plate 3 situated in the bracket 1 over its entire length or, in particular, over the width of all surge protector poles, which is by one of its ends pivoted along the axis in the direction of its length in the bracket 1, for instance by means of studs 3*a* formed on both ends of the signalling plate 3 and pivoted in recesses 1*c* in side walls of the bracket 1, i.e. in external walls of the bracket 1. The free end 3*b* of the signalling plate 3 stretches into the space over the flange 5*b* of the positioning part 5. The free end 3*b* of the signalling plate 3 lies freely on the flange 5*b* of the positioning part 5 in the example shown in FIG. 1. Owing to its arrangement, e.g. from a suitable plastic or fiberglass or another suitable material with a low density and sufficient rigidity, the signalling plate 3 is low-weight while being enough rigid for a proper device function. The signalling plate 3 can pass through openings over the bracket 1 width in the inner walls of the bracket 1 or the bracket 1 can be adjusted for it in such way that the signalling plate 3 is situated in one cavity of the bracket 1 etc.

To make sure that the device is not dependent on one insertion position of the protective members 2 into the bracket 1, e.g. to ensure device function also when rotating the slide-in protective member 2 through 180°, the suspended positioning elements 5 are in the bracket 1 mounted in such manner that also while rotating the slide-in protective member 2 in the bracket 1 through 180° does not come to change in properties of the device, e.g. the suspended positioning elements 5 are in the bracket 1 mounted symmetrically in regard to guide and retaining devices of the corresponding slide-in protective member 2 in the bracket 1.

Then there is mounted a switch 4 in the bracket 1. The switch 4 is preferably mounted in the bracket 1 in the area intended for mounting one of the surge protector poles whereas the control element 4*b* of the switch 4 (a pressure component in the represented arrangement) is situated in the signalling plate 3 movement pathway between the end positions of the signalling plate 3. The switch 4 is fitted with connecting pins 4 to which is an interconnecting element 7 connected or, as the case may be, more interconnecting elements which is/are on the other end connected to the connecting pins 6*a* of the connecting block 6 to which it is possible to connect the not represented wires for remote signalling the state of the surge protector. The signalling plate 3, owing to its low weight and sufficient rigidity, will not cause the switch 4 status change even in the position when it rests upon the switch 4 control element 4*b* by its entire weight.

The surge protector consisting of the slide-in protective members 2 and the bracket 1, in occurrence of surge in the protected electric circuit performs its function—it lowers the surge to an admissible value. Due to ageing and overloading, the slide-in protective member 2 can come to such a change of its properties that the slide-in protective member 2 must be disconnected from the main supply. Such disconnecting from the main supply is provided by an inner mechanism of the slide-in protective member 2. This status change of the slide-in protective member 2 manifests itself also in that the sliding member 2*a* shifts to a new position and as a consequence it frees blocking the movement of the positioning part 5 or, in particular, its indicating end 5*c*. The sliding member 2*a* of the slide-in protective member 2 can be moved into its new position in any direction and into any new position where it does not obstruct the following movement of the positioning part 5. The pressure spring 5*a* of the positioning part 5 presses out the positioning part 5 in the direction of its longitudinal axis and the flange 5*a* of the positioning part 5 presses onto the free end of the signalling plate 3 which is turned on the studs 3*a* and pressed against the wall 1*a* of the bracket 1 by action of the flange. The signalling plate 3 in doing so presses on the control element 4*b* of the switch 4 and a status change of the switch 4 occurs. This change is led by means of the interconnecting element 7 or, as the case may be, interconnecting elements onto the connecting block 6 from where its transfer further to the remote detection of the surge protector status is possible.

The same situation occurs when the slide-in protective member 2 is pulled out from the bracket 1 by means of which is also enabled a remote control of an unauthorized surge protector cut out, for instance by men, etc.

INDUSTRIAL APPLICABILITY

The invention can be used for protection against surge of basically arbitrary electric circuits.

The invention claimed is:

1. A device for remote monitoring of the state of a surge protector having at least a single pole, comprising:

a bracket, and a slide-in protective member associated with each pole of the surge protector;

a suspended positioning element mounted for reciprocal movement in the bracket, the positioning element having an indicating end engaged with the slide-in protective member in operational connection of the surge protector to an electrical circuit, and an opposite end with a flange configured thereon, the suspended positioning element configured to move relative to the bracket upon a status change of the slide-in protective member causing the slide-in protective member to disengage from the indicating end of the suspended positioning element;

a signaling plate having a first end pivotally mounted in the bracket, and an opposite free end disposed in the path of movement of the flange on the suspended positioning element so as to be engaged by and pivoted by the flange;

a switch mounted in the bracket, the switch having a control element activated by engagement of the free end of the signaling plate after the status change of the slide-in protective member causing generation of an electrical signal indicating a change of protection status of the surge protector.

2. The device as in claim 1, wherein the suspended positioning element is mounted in the bracket so that the indicating end of the suspended positioning member remains engaged against the slide-in protective member through a 180 degree rotation of the slide-in protective member.

3. The device as in claim 1, further comprising a biasing spring disposed between the opposite end of the suspended positioning member and the bracket.

4. The device as in claim 3, wherein the biasing spring is seated in a cavity defined in the opposite end of the suspended positioning member.

5. The device as in claim 1, wherein the signaling plate includes studs on its first end, the studs seated in recesses in the bracket.

6. The device as in claim 1, wherein the signaling plate is made of fiberglass.

7. The device as in claim 1, wherein the signaling plate is made of plastic.

8. The device as in claim 1, wherein the slide-in protective member and bracket comprise corresponding identification elements so that only a particular slide-in protective member having particular characteristics is slidable into the bracket for each pole in the surge protector.

* * * * *